United States Patent Office 2,781,408
Patented Feb. 12, 1957

2,781,408

POLYMERIZATION OF MIXTURES OF ALKYNES AND OLEFINS TO AROMATIC HYDROCARBONS

Donald R. Witt, Bartlesville, Okla., and Norman C. Carter, Old Ocean, Tex., assignors to Phillips Petroleum Company, a corporation of Delaware No Drawing. Application February 1, 1954,
Serial No. 407,576

17 Claims. (Cl. 260—673)

This invention relates to the polymerization and copolymerization of mixtures of 1-alkynes with 1-olefins in contact with supported chromia-containing catalyst to produce aromatic and other hydrocarbons.

The object of the invention is to provide a novel process for polymerizing and copolymerizing mixtures of alkynes and 1-olefins to form aromatic hydrocarbons. Another object of the invention is to provide a novel process for producing toluene and benzene from a mixture of acetylene and propylene. Other objects of the invention will become apparent from a consideration of the accompanying disclosure.

We have found that a mixture of a 1-alkyne with a 1-olefin can be polymerized and copolymerized to aromatic hydrocarbons comprising principally benzene and alkyl benzenes in contact with supported chromia-containing catalyst, at a temperature in the range —50 to 350° F., and at relatively low pressures, such as those in the range of 400 to 800 p. s. i. g. The alkyne and olefin may be in any proportions in the mixture but it is preferred to restrict the ratio of alkyne to olefin to the range of 2:1 to 1:10. The process is generally effected with the mixture of the selected alkyne and the olefin in admixture with a suitable hydrocarbon diluent under sufficient pressure to maintain the reaction mixture in liquid phase; however, it is feasible to effect the polymerization in vapor phase with concentration of the reactants up to 100% of the feed stock. It is generally preferred that the concentration of the reactants be maintained in the range of 1.0 to 30 weight percent of the mixture of reactants and diluents and, more desirably, the concentration should be below about 20 weight percent of the feed.

In accordance with the invention the selected alkyne must correspond to the formula HC≡CR, wherein R can be a substituent selected from the group consisting of hydrogen, alkyl, alkenyl, cycloalkyl, aryl, alkaryl, and aralkyl. In instances where R is other than hydrogen, it is preferred that R is normal alkyl and that the alkyl be limited to 3 to 8 carbon atoms when R is normal alkyl. Specific examples of alkynes corresponding to the above formula which are effective in our process are methylacetylene, 1-hexyne, 1-octyne, 3-methyl-1-butyne, 3,3-dimethyl-1-butyne, vinylacetylene, 4-penten-1-yne, 3-penten-1-yne, 6-hepten-1-yne, 4-hepten-1-yne, 3-hepten-1-yne, cyclopentylacetylene, cyclohexylacetylene, (4-methylcyclohexyl) acetylene phenylacetylene, 1-naphthylacetylene, 4-tolylacetylene, benzylacetylene, and the like.

The 1-olefin which may be utilized in the process in admixture with the alkyne includes both the mono and diolefins. As an illustration, an admixture of acetylene with propylene is polymerized principally to benzene and toluene in contact with supported chromia catalyst. It is preferred to utilize 1-olefins having a maximum chain length of 8 carbon atoms and no branching nearer the double bond than the 4-position.

The diluents which can be used in the process comprise hydrocarbons which are inert and liquid under the conditions of the process. The aliphatic paraffins of 3 to 12 carbon atoms per molecule are the preferred diluents, although cycloparaffins and aromatics may also be used. Diluents which have been found to be particularly advantageous are isooctane, methylcyclohexane and isobutane.

The process may be operated over a relatively wide range of temperature of —50 to 350° F., but it is preferred to operate in the range of 50 to 200° F.

It is essential to the process to utilize a catalyst comprising chromia deposited on a support selected from the group consisting of silica, alumina, zirconia, titania and activated clay. These supports may be fluorinated by methods known in the art and the support may comprise any combination of these mixtures, but a silica-alumina support is most effective and particularly one in which the alumina is restricted to not more than 15 weight percent of the support. Detailed description of the preparation of the chromia-containing catalyst which is essential to this process is disclosed fully in the co-pending application of J. P. Hogan and R. L. Banks, Serial No. 333,576, filed January 27, 1953.

The following specific examples illustrate the invention, but are not to be construed as imposing unnecessary limits thereon:

Example I

The catalyst contained about 2.5 percent Cr, and was prepared in the usual manner by impregnating silica-alumina pills. The feed composition was

| | Mol percent |
|---|---|
| Acetylene | 4.4 |
| Propylene | 4.6 |
| Isobutane | 91.0 |

Run conditions were 195° F., 600 p. s. i. g., and 2.5 LHSV. Effluent from the reactor passed through a small trap and was then fed to the fractionating column where the isobutane was stripped off.

Analysis of the kettle product by infrared spectroscopy gave 85.8 volume percent benzene, 2.9 volume percent toluene, and 11.3 volume percent other liquid. Some toluene was also found in the trap liquid, but as the amount of liquid was small it probably would not increase the toluene yield to much over 3 percent. The "other liquids" probably comprised higher alkyl benzenes, but no analysis was made to distinguish this "other liquid" from that produced in the polymerization of acetylene alone. The point of distinction between this product and that produced from acetylene alone is the presence of toluene. No toluene has ever been found in the product from acetylene polymerization over this same catalyst.

Example II

Another run was made utilizing a catalyst consisting essentially of chromia deposited on silica-alumina in a concentration of 2.5 weight percent Cr. The feed utilized was a mixture of n-pentane, acetylene, and ethylene, the concentration of acetylene being 3.7 mol percent, while the concentration of ethylene was 4.7 mol percent. The temperature was 194° F. and the space velocity was 2.7 Lv./v./hr. The operating pressure was 600 p. s. i. g. Infrared analysis showed the presence of mono-substituted benzenes in the product along with 90 percent benzene and polyethylene.

Example III

A run was made utilizing a chromia-containing catalyst of the same composition as that of Example II. The feed was a mixture of n-pentane, acetylene, and ethylene, the concentrations of these olefins being 3.6 and 3.1 mol percent, respectively. The temperature was 345° F. and the space velocity was 2.0 Lv./v./hr. The operating pressure was 600 p. s. i. g. Infrared analysis showed that the product contained considerable benzene and polyethylene and also a small amount of 1,3-cyclohexadiene.

When the reaction mixture comprises 1,3-butadiene and acetylene, the product contains various aromatics, including 1,4-cyclohexadiene.

Various modifications of the invention will become apparent to those skilled in the art and the illustrative details are not to be construed as imposing unnecessary limitations on the invention.

We claim:

1. A polymerization process comprising contacting a mixture of an alkyne corresponding to the formula HC≡CR, wherein R is selected from the group consisting of hydrogen, normal alkyl of not more than 8 carbon atoms, alkenyl, cycloalkyl, aryl, alkaryl, and aralkyl, and an aliphatic olefin with a catalyst comprising chromium oxide and a support comprising at least one member of the group consisting of silica, alumina, zirconia, titania, and activated clay under polymerizing conditions including a temperature in the range of −50 to 350° F. and a pressure in the range of 400 to 800 p. s. i. g. to produce copolymer comprising aromatic hydrocarbons.

2. The process of claim 1 in which said alkyne is acetylene.

3. The process of claim 1 in which said alkyne is acetylene and said olefin is propylene.

4. The process of claim 1 in which said catalyst comprises chromia-silica-alumina.

5. The process of claim 1 in which said aliphatic olefin is a monoolefin.

6. The process of claim 1 in which said aliphatic olefin is a diolefin.

7. The process of claim 1 in which said alkyne is acetylene and said olefin is butadiene.

8. The process of claim 1 wherein said mixture includes a hydrocarbon diluent.

9. The process of claim 8 in which the total concentration of the alkyne and the olefin in said mixture is in the range of 1 to 30 weight percent.

10. The process of claim 8 in which said diluent is an aliphatic paraffin having from 3 to 12 carbon atoms.

11. The process of claim 8 in which the alkyne and the olefin each has a maximum of 8 carbon atoms, and there is no branching in the olefin closer to the double bond than the 4-position.

12. The process of claim 8 effected at a temperature in the range of 50 to 200° F.

13. A process for copolymerizing acetylene and propylene comprising contacting a mixture of a hydrocarbon diluent, acetylene, and propylene in which the ratio of acetylene to propylene is in the range of 2:1 to 1:10 and the total weight of the acetylene and propylene is in the range of 1 to 20 percent of the mixture, with a chromia-silica-alumina catalyst containing Cr in the range of 0.1 to 10 weight percent, at a temperature in the range of −50 to 350° F., and under sufficient pressure to maintain said mixture at least partially in liquid phase, so as to produce toluene.

14. The process of claim 13 in which said diluent is an aliphatic paraffin having from 3 to 12 carbon atoms per molecule.

15. The process of claim 13 in which the pressure is maintained in the range of 400 to 800 p. s. i. g.

16. The process of claim 1 in which the support has been fluorinated so as to contain a minor amount of fluorine in combined form.

17. A process comprising catalytically polymerizing an alkyne corresponding to the formula HC≡CR, wherein R is selected from the group consisting of hydrogen, normal alkyl of 3 to 8 carbon atoms, alkenyl, cycloalkyl, aryl, alkaryl, and aralkyl, with an aliphatic olefin under polymerizing conditions including a temperature in the range of −50 to 350° F. and sufficient pressure to maintain the reactants at least partially in liquid phase but not over 800 p. s. i. g. so as to produce copolymer comprising aromatic hydrocarbons.

References Cited in the file of this patent

UNITED STATES PATENTS

| | | |
|---|---|---|
| 2,397,301 | Vesterdal | Mar. 26, 1946 |
| 2,444,131 | Delattre-Seguy | June 29, 1948 |
| 2,550,531 | Ciapetta | Apr. 24, 1951 |
| 2,608,594 | Robinson | Aug. 26, 1952 |
| 2,645,605 | Lang et al. | July 14, 1953 |

OTHER REFERENCES

Chemical Abstracts, vol. 43, page 8661a (1949). Original article by Carrozzi.